United States Patent Office 3,103,411
Patented Sept. 10, 1963

3,103,411
METHOD OF REMOVING HYDROGEN SULFIDE FROM GASES BY OXIDATION OF ELEMENTAL SULFUR
Werner Fuchs, Ludwigshafen (Rhine), Germany, assignor to Badische Anilin- & Soda-Fabrik Aktiengesellschaft, Ludwigshafen (Rhine), Germany
No Drawing. Filed June 7, 1960, Ser. No. 34,370
Claims priority, application Germany June 11, 1959
6 Claims. (Cl. 23—2)

This invention relates to an improved process for the oxidation of hydrogen sulfide. It relates especially to a process for the removal of hydrogen sulfide from gases containing the same by oxidation with molecular oxygen, sulfur dioxide or gases containing the same in the presence of special liquids not previously used for this purpose.

For the recovery of sulfur from hydrogen sulfide and also for the removal of hydrogen sulfide from gases, use is often made of partial oxidation by which the hydrogen sulfide is converted into sulfur. Gases containing oxygen or sulfur dioxide may be used as oxidizing agents. In order to achieve a sufficiently high reaction speed even at low temperatures, the oxidation has already been carried out in the presence of catalysts, such as aluminum oxide, bauxite or active carbon.

The oxidation is carried out for example by the so called Claus process or by the use of active carbon as catalyst in the gas phase or by the use of solvents in the liquid phase. As solvents there have hitherto been used for example water, aqueous salt solutions, hydrocarbon oils, alcohols, amines and also mixtures of liquid hydrocarbons with phenols and amines. A disadvantage of the solvents hitherto used, of which polyalcohols and dimethylaniline are the most suitable, is that the reaction does not proceed sufficiently rapidly and completely and that the sulfur, which is obtained in a fine form, can be separated only with difficulty. Some of the prior solvents also have the disadvantage that when they are used, not only sulfur but undesirable byproducts are formed.

It is an object of the present invention to provide a process for the partial oxidation of hydrogen sulfide with oxygen, sulfur dioxide and/or mixtures containing such oxidizing gases, in the presence of an inert medium which is liquid at the reaction temperature and which promotes the partial oxidation.

Another object is to provide special liquids in which the oxidation of hydrogen sulfide from gases containing the same with oxygen or sulfur dioxide takes place rapidly and completely in a wide temperature range so that the process is generally applicable and the elementary sulfur formed occurs in a particle size in which it may be readily separated from the liquid. Yet another object of the invention is the removal of hydrogen sulfide from gases which contain any amounts thereof down to about 0.001% by volume of hydrogen sulfide for the purpose of gas purification with the recovery of the sulfur contained in the initial gases. A further object of the invention is a process for the purification of naturally occurring or synthetic gases of which one contains any amount, even very small amounts, of hydrogen sulfide and the other contains sulfur dioxide, from the sulfur-containing components with recovery of elementary sulfur without the gases being mixed with each other or being brought into direct contact with each other.

We have found that the said objects are achieved and the partial oxidation of hydrogen sulfide with oxygen or with gases containing oxygen and/or sulfur dioxide or with sulfur dioxide alone to elementary sulfur in the liquid phase, i.e. with the co-employment of a solvent, can be effected especially rapidly and advantageously by carrying it out in the presence of pyrrolidone and its derivatives N-substituted by alkyl groups with 1 to 4 carbon atoms.

The liquids according to the present invention may also be used in admixture with each other or in admixture with other solvents, as for example with water or saturated monohydric and polyhydric aliphatic alcohols, such as alkanols with 1 to 4 carbon atoms, and also diethylene glycol, triethylene glycol and glycol monomethyl ether. Such mixtures may contain up to 60% by weight, advantageously about 0.1 to 20% by weight of water or alcohol, the most suitable amount of water or alcohol to be used being different for the different acid amides but readily ascertainable by preliminary experiment.

As initial gases there may serve any gases containing hydrogen sulfide with any content of hydrogen sulfide. For example gas mixtures with 0.001% by volume of hydrogen sulfide are suitable just as much as mixtures with 1% by volume or more or as much as pure or practically pure hydrogen sulfide. Gases which besides hydrogen sulfide also contain sulfur dioxide, as for example Claus contact furnace waste gas, are especially useful. Suitable industrial initial gases containing hydrogen sulfide include natural gas, cracking gas, watergas, converter or producer gas, platforming gas, brown coal low temperature carbonization gas, shale oil low temperature carbonization gas and the waste gases from factories working up viscose rayon and waste gases from gas washing plant using aminoalcohols or aqueous solutions of alkali salts of amino acids.

The oxidizing agent is preferably used in about the calculated amount. An excess of oxidizing agent may however be used because the oxidation does not proceed beyond the oxidation stage of elementary sulfur under the reaction conditions even with a large excess of oxidizing agent. If desired, less than the theoretically calculated amount of oxidizing agent may be used, but the oxidation to elementary sulfur then proceeds less completely. Suitable oxidizing agents are molecular oxygen, fractions containing oxygen from air separation plant, air, coke-oven gas which contains oxygen, sulfur dioxide, gases obtained in the roasting of sulfurous ores, combustion gases of sulfur, waste gases from sulfuric acid fractions and smoke gas.

For carrying out the process there may be used any apparatus which ensures intensive contact of gases and liquids. For example a reaction tower, preferably a packing tower, may be used into which the gas containing hydrogen sulfide and the oxidizing agent are introduced at the bottom and the solvent, for example N-methylpyrrolidone, is trickled down from the top. Other suitable apparatus are bubble columns filled with liquid, bubble cap columns, or mechanical washers, for example disintegrators. If sulfur dioxide or gases containing the same are used as the oxidizing agent, these may be led into the reaction tower at one or more points simultaneously, advantageously above the supply of the gas containing hydrogen sulfide. When working with the sulfur dioxide as the oxidizing agent, this may also be previously dissolved in one of the solvents to be used according to this invention and the solution of sulfur dioxide then used for oxidizing the gas containing hydrogen sulfide. Equally, the hydrogen sulfide may be dissolved out from the gases by means of the solvents according to this invention, which are liquid at the reaction temperature, and the resultant solutions then reacted with a gas containing sulfur dioxide. The two last-mentioned methods of operation have the advantage that gas streams containing hydrogen sulfide or sulfur dioxide which are to be purified do not have to be mixed with each other. The same advantage is also achieved when the gases containing combined sulfur are washed out separately from two gas streams, of which one contains hydrogen sulfide and the other sulfur dioxide, and the resultant solutions are mixed with each other and thus brought to reaction.

A further embodiment of the process comprises impregnating carrier substances, such as active carbon, pumice or kieselguhr, with the solvents, and then leading the gases containing hydrogen sulfide and the oxidizing agent thereover.

The amount of liquid used for the reaction is not important but at least sufficient must be used to ensure on the one hand that the sulfur formed and precipitated remains a liquid capable of dripping, i.e. conveyable, and on the other hand that the water content of the liquid is not caused by the water of reaction formed and by any water introduced with the initial materials to rise above the said limit of about 60% by weight, advantageously 20% by weight. The upper limit of the amount to be used is determined solely by economic considerations.

While the oxidation can be carried out at room, lowered or elevated temperature and at atmospheric, reduced or increased pressure, as for example at 0.5 to 50 atmospheres, advantageously 1 to 30 atmospheres, it is usual to work at atmospheric pressure and temperatures between about −20° and 150° C., preferably at about 15° to 120° C. In all cases, however, the temperature and pressure must be chosen so that the compounds or mixtures used according to this invention are still liquid.

At working temperatures below the melting point of sulfur, the sulfur formed and occurring in a well crystallized form may readily be separated from the liquid medium in the usual way, for example by filtration, suction filtration, centrifuging or decantation. If the oxidation takes place above the melting point of sulfur, the sulfur may also be readily recovered in liquid form by separation of the liquid phases. From the mother liquors, which are advantageously used again for further oxidations after removal of the water formed by the oxidation, there may be obtained if desired further fractions of sulfur, for example by crystallization at lower temperatures or by evaporation of at least part of the solvent co-employed in the oxidation.

The process is suitable both for the recovery of sulfur and for the removal of hydrogen sulfide and/or sulfur dioxide from gases. It may be carried out discontinuously or continuously.

The following examples will further illustrate this invention but the invention is not restricted to these examples. The parts, unless otherwise stated, are parts by weight and the parts by weight bear the same relation to the parts by volume as the kilogram to the liter.

*Example 1*

631 parts by volume of hydrogen sulfide, 631 parts by volume of sulfur dioxide and 6,310 parts by volume of nitrogen are led as a mixture per hour at 40° C. into 200 parts by volume of N-methylpyrrolidone. The waste gas is led through a 2.5% solution of cadmium acetate. After 16 hours of operation, no analytically determinable amounts of cadmium disulfide are precipitated from the cadmium acetate solution. The crystalline sulfur, which separates and settles well in the clear reaction solution is recovered by filtration. After 16 hours, a total of 21.5 parts of sulfur are obtained.

If on the other hand there is used 200 parts by volume of diethylene glycol instead of N-methyl-pyrrolidone and the oxidation is carried out with the same amounts of gas under the same conditions, the sulfur is deposited in such a fine state of dispersion that even after 14 days it has not yet completely settled. The whole of the waste gas which has been formed after operation for a total of 16 hours contains 3,920 parts by volume of hydrogen sulfide determined as cadmium sulfide by precipitation. Thus only 61.2% of the hydrogen sulfide has been converted.

*Example 2*

2,100 parts by volume of hydrogen sulfide and 2,000 parts by volume of sulfur dioxide are led per hour into 20 parts of N-isobutylpyrrolidone at 20° C. The current of waste gas, which is analyzed for the content of hydrogen sulfide, is free from hydrogen sulfide.

By working under the same conditions in the same way except that 20 parts of dimethylaniline are used as solvent instead of N-isobutylpyrrolidone, 440 parts of hydrogen sulfide, determined as cadmium sulfide, can be detected in the waste gas stream per hour.

*Example 3*

Into an absorption tower filled with filler bodies there are led per hour at 15° C. 1000 parts by volume of a gas which consists of 95% by volume of methane and 5% by volume of hydrogen sulfide, the introduction being effected at the bottom of the tower. 15 parts by volume of N-methylpyrrolidone per hour are trickled through the tower, while at the same time the amount of sulfur dioxide calculated for the oxidation of the hydrogen sulfide (25 parts by volume per hour) is supplied 0.7 meter above the point at which the gas is introduced. Elementary sulfur forms and is carried away by the solvent; it can be separated by filtration. 0.099 part of sulfur per hour is obtained. The methane leaving the tower is free from hydrogen sulfide. The methylpyrrolidone separated is returned to the absorption tower after the removal therefrom of the water of reaction contained therein down to a content of about 5%.

*Example 4*

Into a bubble column which has a diameter of 5 cm. and a height of 80 cm. from the gas-permeable base plate to the gas outlet pipe there is charged commercial N-methylpyrrolidone until the height of the liquid solvent in the column is 50 cm. Through a gas supply pipe below the base plate, hydrogen sulfide to which 2% by volume of oxygen have been added is led at 30° C. into the column in an hourly amount of 15 liters. After an operational period of 8 hours, the sulfur dissolved and suspended in the liquid is recovered by evaporating the solvent. 3 grams of elementary sulfur are obtained.

*Example 5*

A solution of 200 parts by volume of hydrogen sulfide in 10 parts by volume of commercial pyrrolidone is shaken in an oxygen atmosphere at 15° C. The oxygen used up is replenished by leading fresh oxygen into the shaking vessel and the consumption of oxygen is followed. After an amount of oxygen of 101 parts by volume has been absorbed, which takes about 20 minutes the shaking is discontinued. Hydrogen sulfide cannot be detected either in the solution or in the gas space. 0.26 part of elementary sulfur is obtained by filtering the treated solution.

On the other hand if a solution of 110 parts by volume of hydrogen sulfide in 10 parts by volume of diethylene glycol is used and the treatment is carried out in the same way under the same conditions, no absorption of oxygen can be detected. There is no oxidation of the hydrogen sulfide to sulfur.

*Example 6*

80 ccs. of pyrrolidone are charged into a tubular vessel 350 mm. long and 25 mm. in diameter which is provided at the lower end with a frit, and a gas mixture of 4 liters of hydrogen, 4.5 liters of carbon monoxide, 1.4 liters of hydrogen sulfide and 0.7 liter of sulfur dioxide is led per hour through the frit into the liquid. The introduction takes place at a temperature of 150° C. The gas leaving the liquid, which is withdrawn from the upper end of the vessel, consists of hydrogen and carbon monoxide. The content of hydrogen sulfide in this gas is less than 0.03% by volume.

By using 80 ccs. of formylpiperidine or 80 ccs. of N-methylpyrrolidone as the reaction liquid instead of pyrrolidone, and by working otherwise in the same way as described in the preceding paragraph, the hydrogen sulfide content in the waste gas leaving the vessel is again less than 0.03% by volume.

*Example 7*

Into the bubble column which has a diameter of 2.5 cm. and a height of 700 cm. from the gas-permeable base plate to the gas outlet pipe there is charged 0.25 liter of N-methylpyrrolidone which contains in each mol. 0.4 mol of water. The solvent is heated to 80° C. and kept at this temperature. A gas mixture, heated to 65° C., is led through one supply pipe into the column in an hourly amount of 100 liters. The gas mixture contains 2.8% by volume of hydrogen sulfide, 97.2% by volume of nitrogen and about 130 mg. of water vapor per liter. Through the other inlet pipe there are introduced at the same time 1.4 liters per hour of sulfur dioxide. The waste gas from the bubble column is free from hydrogen sulfide.

After 5 hours, the introduction is interrupted, the contents of the column are drained off and filtered. 29.5 grams of elementary sulfur are obtained. The filtrate is returned to the column and the introduction continued in the said manner. There is no increase in the water content of the solvent under the said conditions.

*Example 8*

120 normal cubic meters of a gas mixture consisting of 98.5% by volume of methane and 0.5% by volume of hydrogen sulfide are led per hour at 40° C. into the bottom of an absorption tower filled with filler bodies which is 6 meters high and 0.3 meter in internal width. 200 liters of aqueous N-methylpyrrolidone per hour are supplied to the top of the column, the molar ratio of N-methylpyrrolidone and water being 1:0.3. At the same time, at a point 2 meters above the gas supply, there is led into the tower in gaseous phase the amount of sulfur dioxide (900 normal liters per hour) calculated for the oxidation of the hydrogen sulfide. The elementary sulfur formed, which is suspended in the solvent and leaves the tower therewith, is filtered off from the solvent and washed with water. 3.8 kilograms of elementary sulfur are obtained per hour. The gas mixture escaping at the top of the tower is free from hydrogen sulfide. After filtering off the sulfur, the solvent is used again for trickling through the tower.

By using an aqueous N-methylpyrrolidone which contains 0.65 mol of water per mol for the trickling of the absorption tower, and working otherwise in the same way, the gas escaping from the top of the tower is similarly free from hydrogen sulfide.

*Example 9*

100 ml. of commercial N-methylpyrrolidone are charged into the bubble column 350 mm. long and 25 mm. in diameter through a frit situated at the bottom and 10 liters per hour of a nitrogen current which contains 0.001% by volume of hydrogen sulfide and 0.002% by volume of sulfur dioxide are led at −15° C. into the solution through the frit. The waste gas from the bubble column is led through a 5% by weight lead acetate solution to test the hydrogen sulfide content before it is supplied for further use. The waste gas is free from hydrogen sulfide. Also after 4 days uninterrupted operation the lead acetate is still clear and no lead sulfide has yet been precipitated.

*Example 10*

100 ml. of one of the following solvents is charged into the bubble column described in Example 9 and a mixture of 3 liters of hydrogen sulfide, 1.5 liters of sulfur dioxide and 7 liters of methane is led in per hour at −18° to −20° C. There are used as solvents: N-methylpyrrolidone, a mixture of 90 ml. of N-methylpyrrolidone and 10 ml. of water, a mixture of 80 ml. of N-methylpyrrolidone and 20 ml. of methanol, a mixture of 90 ml. of N-methylpyrrolidone and 10 ml. of diethylene glycol, a mixture of 90 ml. of N-methylpyrrolidone and 10 ml. of triethylene glycol and a mixture of 90 ml. N-isobutylpyrrolidone and 10 ml. of glycol monomethyl ether.

*Example 11*

From an hourly stream of 900 normal cubic meters of natural gas with 61% by volume of methane, 2.8% by volume of ethane, 16.4% by volume of carbon dioxide, 7.2% by volume of nitrogen and 12.6% by volume of hydrogen sulfide, the hydrogen sulfide is washed out to less than 0.05% by volume in an absorption tower 0.2 meter in diameter and 12 meters high filled with ceramic annular filler bodies 15 mm. in diameter with 0.85 normal cubic meter of N-methylpyrrolidone per hour at 30 atmospheres. This solution of hydrogen sulfide is united with a solution of sulfur dioxide in N-methylpyrrolidone which has been obtained by washing out from 700 normal cubic meters per hour of a roaster gas with 8.1% by volume of sulfur dioxide, 8% of oxygen and 83.9% of nitrogen by means of 10 normal cubic meters of N-methylpyrrolidone. Upon introducing the solution containing sulfur dioxide into the solution containing hydrogen sulfide which is under a pressure of 30 atmospheres, the hydrogen sulfide is oxidized completely to sulfur within 5 seconds. After cooling and decompressing the solution there are obtained per hour 235 kilograms of elementary sulfur by centrifuging.

*Example 12*

From a gas which contains 54.5% by volume of hydrogen, 36.2% of carbon dioxide, 7.4% of methane, 0.7% of nitrogen, 0.2% of hydrocarbon gases and 1% by volume of hydrogen sulfide the hydrogen sulfide is washed out under 30 atmospheres as in the preceding example with 1 part of N-methylpyrrolidone per 1,000 parts by volume of gas. In order to oxidize to sulfur the hydrogen sulfide contained in the N-methylpyrrolidone, the solution, which contains dissolved therein 10 parts by volume of hydrogen sulfide to 1 part of N-methylpyrrolidone, is introduced, after decompression to normal pressure, into a mechanical washer through which there are charged at the same time in cocurrent 2,500 parts by volume of a waste gas from a sulfuric acid plant which contains 0.2% by volume of sulfur dioxide and 4% by volume of oxygen as well as nitrogen. 1.3 parts of elementary sulfur are filtered off from each 1 part of methylpyrrolidone leaving the washer.

*Example 13*

20 liters per hour of air, which contains 0.015% by volume of hydrogen sulfide, are passed at 20° C. through a column charged with 30 g. of aluminum oxide impregnated with 7.5 g. of N-methylpyrrolidone. The air leaving the column has a content of hydrogen sulfide of less than 0.0001% by volume.

*Example 14*

25 liters per hour of waste gas, which contains 0.003% by volume of sulfur dioxide and 0.001% by volume of hydrogen sulfide are passed through a column charged with 54 g. of pumice of the grain size 2 mm. which has been impregnated with 15 g. of N-methylpyrrolidone. No more hydrogen sulfide is detectable in the gas leaving the column.

I claim:

1. A process for the production of elementary sulfur by oxidation of hydrogen sulfide and a method for the removal of hydrogen sulfide from gaseous mixtures by oxidation of the hydrogen sulfide to elementary sulfur which comprises reacting a gas selected from the group consisting of hydrogen sulfide and gaseous mixtures containing hydrogen sulfide in an amount of at least 0.001% by volume with at least one oxidizing agent selected from the group consisting of oxygen, sulfur dioxide and gaseous mixtures containing at least one of said oxidizing agents, in a liquid solvent selected from the group consisting of pyrrolidone and N-alkylpyrrolidones with one to four carbon atoms in the alkyl group.

2. A process as claimed in claim 1, wherein the liquid is N-methylpyrrolidone.

3. A process for the production of elementary sulfur by oxidation of hydrogen sulfide and a method for the removal of hydrogen sulfide from gaseous mixtures by oxidation of the hydrogen sulfide to elementary sulfur which comprises reacting a gas selected from the group consisting of hydrogen sulfide and gaseous mixtures containing hydrogen sulfide in an amount of at least 0.001% by volume with at least one oxidizing agent selected from the group consisting of oxygen, sulfur dioxide and gaseous mixtures containing at least one of said oxidizing agents in a solvent mixture of 0–60% by weight of water and 40–100% by weight of an organic compound selected from the group consisting of pyrrolidone and N-alkylpyrrolidones, in which the alkyl substituent has 1 to 4 carbon atoms.

4. A process for the production of elementary sulfur by oxidation of hydrogen sulfide and a method for the removal of hydrogen sulfide from gaseous mixtures by oxidation of the hydrogen sulfide to elementary sulfur which comprises reacting a gas selected from the group consisting of hydrogen sulfide and gaseous mixtures containing hydrogen sulfide in an amount of at least 0.001% by volume with at least one oxidizing agent selected from the group consisting of oxygen, sulfur dioxide and gaseous mixtures containing at least one of aid oxidizing agents in a solvent mixture of an alcohol selected from the group consisting of alkanols with 1 to 4 carbon atoms, diethylene glycol, triethylene glycol and glycol monomethyl ether and an organic compound selected from the group consisting of pyrrolidone and N-alkylpyrrolidones in which the alkyl substituent has 1 to 4 carbon atoms, the alcohol content of the mixture used being below 60% by weight.

5. In a process for the oxidation of hydrogen sulfide by reaction with gases containing sulfur dioxide with the formation of elementary sulfur and simultaneous removal of the hydrogen sulfide from a gas mixture the improvement which comprises: dissolving the sulfur dioxide from the gases containing it in a liquid consisting essentially of a liquid selected from the group consisting of pyrrolidone and a N-alkylpyrrolidone with 1 to 4 carbon atoms in the alkyl group and reacting the solution with gases containing hydrogen sulfide.

6. In a process for the oxidation of hydrogen sulfide by reaction with gases containing sulfur dioxide with the formation of elementary sulfur and simultaneous removal of the hydrogen sulfide from a gas mixture the improvement which comprises: dissolving the hydrogen sulfide from the gas mixture containing hydrogen sulfide in a liquid consisting essentially of a liquid selected from the group consisting of pyrrolidone and a N-alkylpyrrolidone with 1 to 4 carbon atoms in the alkyl group, dissolving the sulfur dioxide from a gas mixture which contains sulfur dioxide in a liquid and causing the hydrogen sulfide to react with the sulfur dioxide by combining the two liquids.

References Cited in the file of this patent

UNITED STATES PATENTS

| 927,342 | Feld et al. | July 6, 1909 |
| 2,251,216 | Woodhouse | July 29, 1941 |
| 3,023,088 | Urban et al. | Feb. 27, 1962 |

OTHER REFERENCES

Mellor: "A Comprehensive Treatise on Inorganic and Theoretical Chemistry," Longmans, Green and Company, New York, N.Y., volume 10, 1930, pages 134–135.

UNITED STATES PATENT OFFICE
CERTIFICATE OF CORRECTION

Patent No. 3,103,411            September 10, 1963

Werner Fuchs

It is hereby certified that error appears in the above numbered patent requiring correction and that the said Letters Patent should read as corrected below.

Column 3, line 59, for "disulfide" read -- sulfide --; column 6, after line 7, insert the following paragraph:

> In all cases the waste gas from the bubble column is free from hydrogen sulfide. If the waste gas is led through a 5% by weight lead acetate solution, the solution remains clear in all cases without any lead sulfide being precipitated.

Signed and sealed this 19th day of May 1964.

(SEAL)
Attest:
ERNEST W. SWIDER

Attesting Officer

EDWARD J. BRENNER
Commissioner of Patents